United States Patent
Schmidt et al.

(10) Patent No.: US 10,323,970 B2
(45) Date of Patent: Jun. 18, 2019

(54) HOUSING FOR A DEVICE FOR THE METERED DISTRIBUTION OF A MEDIUM, AND METERING DEVICE FOR USE IN THE HOUSING

(71) Applicant: SKF Lubrication Systems Germany GmbH, Walldorf (DE)

(72) Inventors: Holger Schmidt, Klein-Machnow (DE); Dieter Schoenherr, Kleinbeeren (DE); Juergen Kreutzkaemper, Waibstadt-Daisbach (DE)

(73) Assignee: SKF Lubrication Systems Germany GmbH, Walldorf (DE)

( * ) Notice: Subject to any disclaimer, the term of this patent is extended or adjusted under 35 U.S.C. 154(b) by 76 days.

(21) Appl. No.: 15/505,261

(22) PCT Filed: Aug. 6, 2015

(86) PCT No.: PCT/EP2015/068167
§ 371 (c)(1),
(2) Date: Feb. 21, 2017

(87) PCT Pub. No.: WO2016/030166
PCT Pub. Date: Mar. 3, 2016

(65) Prior Publication Data
US 2017/0276532 A1    Sep. 28, 2017

Related U.S. Application Data

(63) Continuation of application No. PCT/EP2015/068167, filed on Aug. 6, 2015.

(30) Foreign Application Priority Data

Aug. 27, 2014   (DE) .................. 10 2014 217 021

(51) Int. Cl.
F16L 37/00    (2006.01)
G01F 15/14    (2006.01)
(Continued)

(52) U.S. Cl.
CPC ............. G01F 15/14 (2013.01); F16N 25/02 (2013.01); G01F 15/006 (2013.01);
(Continued)

(58) Field of Classification Search
CPC .. F16N 25/00; F15B 13/0814; F15B 13/0821; F15B 13/0828; F15B 13/0835;
(Continued)

(56) References Cited

U.S. PATENT DOCUMENTS 3,332,583 A * 7/1967 Lewis .................. A23G 3/0257
222/255
3,447,755 A * 6/1969 Cartwright ............ B05B 1/3026
239/551
(Continued)

FOREIGN PATENT DOCUMENTS

DE           2937443       8/1979
DE      102004023019 A1   12/2005
(Continued)

*Primary Examiner* — Charles Cheyney
(74) *Attorney, Agent, or Firm* — Bryan Peckjian; SKF USA Inc. Patent Dept.

(57) ABSTRACT

A housing for a device for metered dispensing of a medium, the housing including at least one inlet, preferably threadless, configured to allow the medium to enter the housing from a reservoir, a plurality of receptacles, preferably threadless, a metering device in each of the plurality of receptacles, an inlet line connected to the at least one inlet, and a plurality of distribution lines connected to the inlet line and to each of the plurality of receptacles, wherein the housing includes a plastic material.

15 Claims, 4 Drawing Sheets

(51) Int. Cl.
*F16N 25/02* (2006.01)
*G01F 15/00* (2006.01)
*F16N 21/00* (2006.01)
*F16N 25/00* (2006.01)

(52) U.S. Cl.
CPC ........... *F16L 2201/10* (2013.01); *F16N 21/00* (2013.01); *F16N 25/00* (2013.01)

(58) Field of Classification Search
CPC ..... G01F 15/14; G01F 15/006; B05B 7/2486; B05C 5/0279
USPC ....... 222/144.5, 318, 330; 285/242, 400–402
See application file for complete search history.

(56) References Cited

U.S. PATENT DOCUMENTS

| | | | | |
|---|---|---|---|---|
| 4,026,581 A | * | 5/1977 | Pasbrig | F16L 37/0982 285/24 |
| 4,606,476 A | * | 8/1986 | Pocock | B67D 1/07 134/169 R |
| 4,753,372 A | * | 6/1988 | Pocock | B67D 1/07 134/169 R |
| 5,236,641 A | * | 8/1993 | Allen | B05C 11/1044 264/210.8 |
| 5,238,190 A | * | 8/1993 | Herke | B05B 15/652 239/298 |
| 5,282,488 A | * | 2/1994 | Roth | B67D 7/78 137/15.08 |
| 5,564,448 A | * | 10/1996 | Lincoln | B05B 15/658 134/166 R |
| 5,890,629 A | * | 4/1999 | Loew | B67D 3/0009 222/144 |
| 6,079,638 A | * | 6/2000 | Chang | A62C 31/02 239/390 |
| 6,089,620 A | * | 7/2000 | Mota Lopez | F16L 33/225 285/319 |
| 6,306,864 B1 | * | 10/2001 | Welch, Jr. | C07D 239/91 514/266.2 |
| 6,322,242 B1 | * | 11/2001 | Lang | B01F 13/1055 222/132 |
| 6,450,374 B1 | * | 9/2002 | Lohr | B67D 7/74 222/482 |
| 6,505,866 B1 | * | 1/2003 | Nakamura | F16L 37/0985 285/239 |
| 6,627,241 B1 | * | 9/2003 | DeMars | A21C 11/16 118/25 |
| 6,637,779 B2 | * | 10/2003 | Andre | F16L 37/144 285/305 |
| 6,644,620 B2 | * | 11/2003 | Johnson | B67D 3/045 222/504 |
| 7,293,675 B1 | * | 11/2007 | Luhn | B67D 1/07 137/238 |
| 8,678,030 B2 | * | 3/2014 | Knodel | F16K 11/076 137/561 A |
| 2010/0185322 A1 | * | 7/2010 | Bylsma | A61M 5/1413 700/239 |

FOREIGN PATENT DOCUMENTS

| | | |
|---|---|---|
| DE | 3522955 A1 | 12/2009 |
| EP | 0254597 A2 | 1/1988 |
| JP | S537836 A | 1/1978 |
| JP | S63135676 A | 6/1988 |

* cited by examiner

Fig.1

HOUSING FOR A DEVICE FOR THE METERED DISTRIBUTION OF A MEDIUM, AND METERING DEVICE FOR USE IN THE HOUSING

CROSS-REFERENCE

This application is the U.S. National Stage of International Application No. PCT/EP2015/068167 filed on Aug. 6, 2015, which claims priority to German patent application no. 10 2014 217 021.4 filed on Aug. 27, 2014.

TECHNOLOGICAL FIELD

Exemplary embodiments relate to a housing for a device for metered dispensing of a medium, and a metering device for use in the housing.

BACKGROUND

In many areas of technology devices are used for the metered dispensing of a medium. Such media can be a liquid or a gas, for example, compressed air, a lubricant, a cleaning agent, a dye, a hydraulic medium, or the like. Corresponding devices can be, for example, lubricating systems, filling devices, cleaning systems, hydraulic-, pneumatic-systems and/or the like. A further example thereof are metering valves, also called piston distributors in the parlance, in central lubrication systems.

Conventional piston distributors or metering valves are usually comprised of die-casting materials or an extruded profile, semi-finished product, etc., for example, made from zinc or aluminum, steel, brass, or mixed components and have numerous required processing steps in the manufacturing process. These usually include a precision machining of the cylinder surfaces as well as a cutting of numerous threads. Although these processing steps occur today in a highly automated manner, the manufacturing can be relatively expensive. With the conventional concepts, under certain circumstances no further reduction of the manufacturing costs may be possible while maintaining the proven metering technology. Furthermore, the processing steps downstream from the process often require an increased cleaning effort that safely dissipates accumulating chips and burrs.

These difficulties can also occur with devices for metered dispensing of other media.

Moreover, conventional devices for metered dispensing often have a high weight. With the use in mobile machines, for example, in agricultural and construction machines, a reduction of the total weight of a central lubrication system with a view to achieving $CO_2$ reductions is usually desirable.

SUMMARY

There is therefore a need to improve a manufacturing of a device for metered dispensing of a medium and simultaneously to reduce a weight of the device with a comparable size. This need is addressed by a housing as well as a metering device according to the present disclosure.

Exemplary embodiments relate to a housing for a device for metered dispensing of a medium, wherein the housing comprises a plastic as material. Since a plastic is used as material, in some exemplary embodiments the housing can have a low weight with a comparable size and under certain circumstances be manufactured in a simpler manner.

In addition, in some exemplary embodiments the housing comprises at least one inlet, which is configured to allow the medium to enter into the housing from a reservoir, wherein the reservoir can also comprise a pump. For example, when it serves as a metering valve, but also in other cases, the housing can be connected to a device for pressure buildup and/or a device for pressure reduction. These can be connected to the housing, for example, via an inlet line. The device can be, for example, a pump including a relief valve. An inflow from the reservoir, for example, only via gravity, for example as dropping oil may, for example, not be sufficient. The inflow can differ, for example, from a cartridge, a storage tank, or a reservoir without pump. Additionally or alternatively the inlet can be connectable, for example, to the inlet line. In some exemplary embodiments it can thus be made possible that the housing or the metering valve can be installed or used in a dispensing system for the medium, for example a central lubrication system or another system including at least one pump, at least one inlet line, which can also be referred to as a main line, and/or at least one lubricant line, which can also be referred to as a medium line. Here the housing or the metering valve can be fluidly connected to the pump, the main line, and/or the lubricant line. Here the lubricant line can possibly be connected to the housing and a point at which the medium is to be applied or dispensed. Additionally or alternatively the main line can connect the housing to the pump. The connecting here can be effected, for example, directly, without further components or media consumers, or indirectly, i.e., with an interposition of further components. For example, a plurality of housings or metering valves can be uniformly or non-uniformly dispensed along a length of the main line and connected thereto. The main line or inlet line can be, for example, at least 0.1 m, 0.2 m, 0.3 m, 0.5 m, 1 m, 1.5 m, 2 m, 2.5 m, 3 m, 3.5 m, 4 m, 4.5 m 5 m, 5.5 m, 6 m, 6.5 m, and/or up to 10 m, 20 m, 30 m long. At least 2 and/or up to 5, 10, 15, 18, 20, 22, 25, or 30 housings or also lubrication points can possibly connected to the inlet line. The lubrication point can be, for example, the point at which the medium is to be applied. In some exemplary embodiments at each of the lubrication points a partial amount of the medium can possibly be applied which differs from a partial amount of the medium at another lubrication point. Equally, of course, identical partial amounts of the medium can be applied at different locations.

Additionally or alternatively the housing can include at least one receptacle for at least one metering device. The inlet is connected to the receptacle via a line system. In some exemplary embodiments it can thus be made possible that the medium can be guided by the line system in the housing to the receptacle for the metering system. For example, it can then be sufficient if only the line system is sealed with respect to the medium and not the entire housing. A line system here can have, for example, a smaller diameter than the housing itself. The line system can have a length that makes up at least a value of 0.2, 0.25, 0.5, 0.75, or 1 of a width of the housing.

For example, the housing itself, the receptacle, and/or the inlet in the housing can be formed non-threaded. In some exemplary embodiments a metering principle of conventional devices for metered dispensing of the medium can be transferred to a plastic-oriented construction. For example, post-processing-free embodiments can be made possible by the avoidance of threads that are usually only expensively reproduced in plastic and under unfavorable conditions can lead to subsidence formations due to the narrow thread flanks. At the inlet and at the receptacle a connection of further components can possibly be effected via non-threaded attachment means. For example, the housing or also the metering valve can be completely non-threaded and also free of thread-forming screws that are in contact with the housing or its plastic. In other words, in some exemplary embodiments connecting pieces and or attaching screws having a thread that engages into the housing can be omitted. Of course in some exemplary embodiments screws or components having a thread or made from a metal can be disposed on components that are disposed on the housing.

Additionally or alternatively the housing itself, the receptacle, and/or the inlet in the housing can be configured metal-free. In some exemplary embodiments the injecting of metal sleeves or other components, for example, in a region of the inlet and/or the receptacle, can be omitted.

The receptacle can comprise, for example, an attachment structure that is configured to interact with a counter-attachment structure of the metering device with the result that the metering device is fixed to the receptacle at least in the flow direction of the medium. Thus under certain circumstances in some exemplary embodiments it can be avoided that the metering device is pushed out of the housing by the medium to be metered. In addition the attachment structure and counter-attachment structure can also be configured to secure the metering device against a displacing on the housing against the flow direction. Under certain circumstances rotational degrees of freedom of the attachment structure with respect to the counter-attachment structure can be permitted. These can possibly be limited by further means. Furthermore at least one seal element can be disposed between the metering device and the receptacle in order to sealingly connect the metering device with respect to the medium to be transported. The metering device can possibly be exchangeable depending on a larger of a partial amount to be metered.

Additionally or alternatively the housing can comprise a front panel. The front panel can be configured in order to at least partially and/or completely enclose a housing shell of the housing, which housing shell can also be referred to as a housing body, wherein the at least one receptacle is disposed and/or the inlet is disposed. In some exemplary embodiments the front panel can also be configured to fix at least one of the metering devices against a rotating with respect to the receptacle. Under certain circumstances further attachment devices can thus be omitted.

Additionally or alternatively the front panel can include at least one installation opening, which corresponds to at least one installation opening in the housing. The front panel can be attached to the housing via an attachment element that is guided through the two installation openings. In some cases the housing can thus also be attached to a holder. In some exemplary embodiments further installation openings, attachment elements, and also an installation space therefor can thus be omitted in order to mount the housing on a holder or another component.

Additionally or alternatively, in some exemplary embodiments means are provided on the housing that impede an incorrect mounting of the housing in such a manner that an incorrect mounting is recognizable. In some exemplary embodiments a risk of an incorrect mounting can thus at least be reduced.

Under certain circumstances the inlet can be connectable to an inlet line via a connection part that is threadlessly inserted in the inlet. Here the connector part can be connected to the connector line, for example, via a clamp-, screw-, and/or plug-connection. The inlet line can have a diameter, for example, that corresponds to a diameter of the inlet. The diameters can also possibly deviate from each other by up to 1%, 2%, 3%, 5%, 6%, 7%, 8%, 9%, 10%, 12% or 15%.

Additionally or alternatively the housing can include at least one axial stop that is configured to secure the connector part at the inlet in the flow direction of the medium. In some exemplary embodiments it can thus be made possible that the connector part is retained on the housing in the flow direction and/or also in the counter-flow direction.

In some exemplary embodiments the connector part is rotatably inserted in the inlet of the housing. Under certain circumstances it can thus be avoided that a torque that acts on the connector part is transmitted to the housing. This can be relevant, for example, if the connector part includes an internal thread, via which it is connected to a thread of a connector line.

Exemplary embodiments also relate to a metering device for use in the housing according to at least one of the preceding exemplary embodiments, wherein the at least one metering device comprises a metering body manufactured from plastic and/or a piston manufactured from plastic. For example, the already-described simplifying in the manufacturing, and the weight reduction for the metering device, can thus also be achieved. Under certain circumstances the metering device can also comprise a connector element manufactured from plastic.

Springs or spring elements used can possibly be manufactured from spring steel and/or also from plastic. As well as the housing, the metering device can also possibly be manufactured threadless, either completely or only at a connection point for the receptacle.

Further advantageous designs are described in more detail below with reference to exemplary embodiments depicted in the drawings, however not limited to such exemplary embodiments.

BRIEF DESCRIPTION OF THE DRAWINGS

The Figures thus schematically show the following views.

DETAILED DESCRIPTION

In the following description of the accompanying depictions, identical reference numbers designate identical or comparable components. Furthermore, summarizing reference numbers are used for components and objects that appear multiple times in an exemplary embodiment or in a depiction, but are described together with respect to one or more features. Components or objects that are described with identical or summarizing reference numbers can be identical with respect to individual, multiple, or all features, for example their dimensions, but possibly also embodied differently provided the description does not explicitly or implicitly indicate otherwise.

Figure 1:
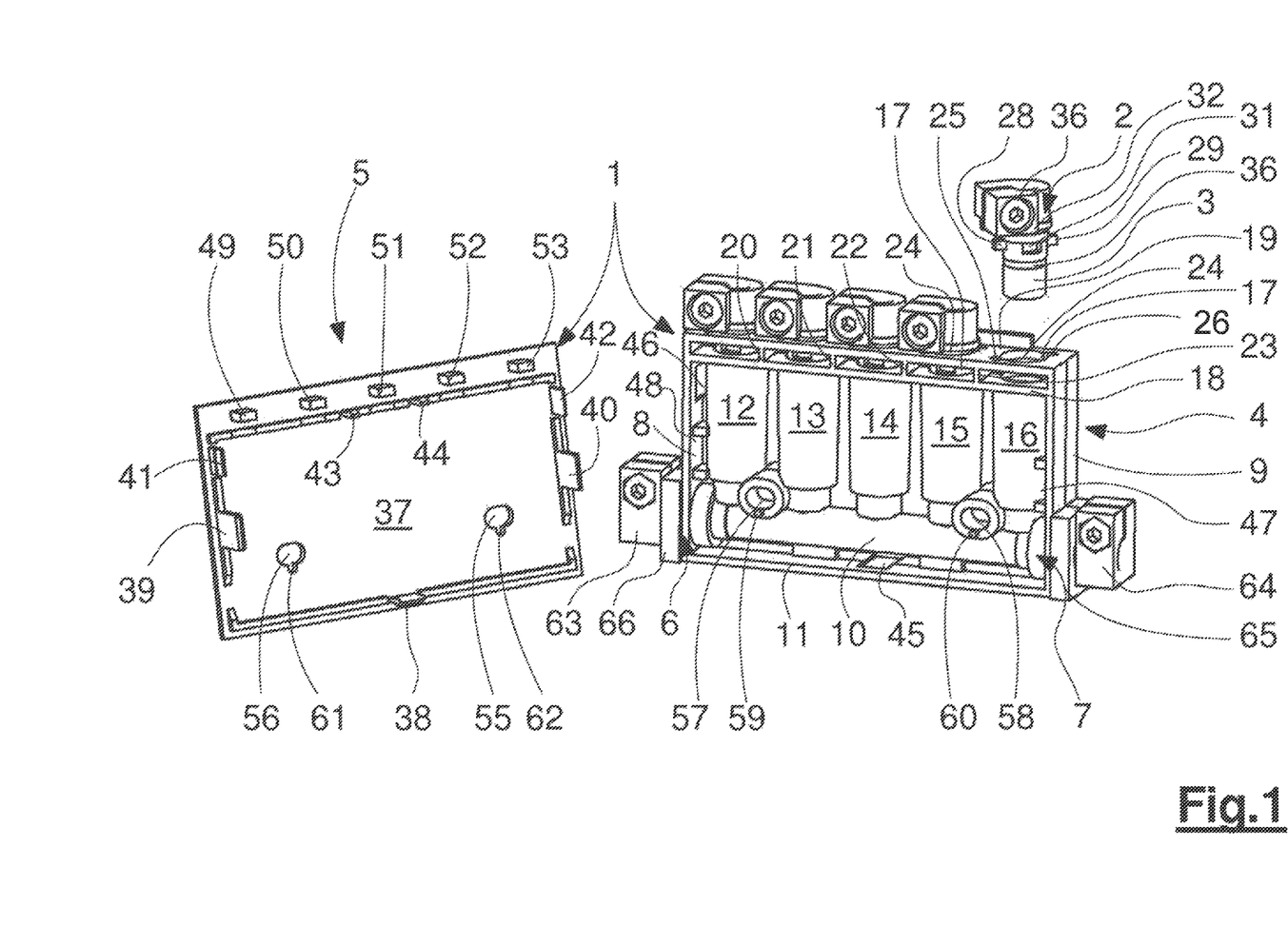
FIG. 1 shows a schematic depiction of a perspective view of a housing according to an exemplary embodiment including a metering device in a partially assembled state.

FIG. 1 shows a schematic depiction of a perspective view of a housing 1 including a metering device 2 in a partially assembled state. The housing 1 for a device for metered dispensing of a medium is manufactured from plastic.

A device for a metered dispensing of a medium can possibly be any device that is configured to apply a first partial amount of the medium at a first point and a second partial amount of the medium at a second point, for example, a piston distributor or a metering valve. The dispensing can be effected, for example, without moving the device. For example, the first partial amount can be applied via a first metering device and the second partial amount via the a second metering device. Here the partial amounts can each have, for example, a predetermined size. The size can be determined, for example, by a metering device used and/or a pumping interval. The dispensing of the partial amounts can be effected, for example, such that after the applying, which occurs in a portioned manner, the two partial amounts remain separate from each other. A portioning or a metering here can be, for example, the applying of a partial amount of the medium with a predetermined or preset volume.

Under certain circumstances the medium can be a liquid and/or a gas, for example compressed air, a cleaning agent, a dye, a hydraulic medium, a lubricant, and/or the like. The lubricant can possibly have different viscosity, for example, a lubricating liquid, a lubricating oil, and/or a lubricating grease.

The plastic can be, for example, a thermoplastic, such as polyethylene, polypropylene, polyoxymethylene, polyethylene, polyproylene, polyamide, polyethylene terephthalate, polybutylene terephthalate, and/or the like, or a thermoset, polyester resin, polyurethane resin, and the like. The housing 1 and/or individual components of the housing 1 can be manufactured, for example, as plastic injection-molded parts. Extrusion, blow molding, thermoforming, and/or foaming also come into consideration as further possible manufacturing methods.

In some exemplary embodiments the housing 1 can comprise plastic as sole material. The housing 1 is formed metal-free. In other exemplary embodiments the housing can comprise further materials, for example, for stabilization purposes. The housing 1 is manufactured as a one-piece plastic injection-molded part. In other exemplary embodiments the housing can also be assembled from components. In order to make it possible that the housing is manufacturable from plastic the housing can optionally be manufactured non-threaded. Threads are usually manufacturable from plastic or with plastic injection-molded parts only at great expense, possibly with a post-processing. In the device including the housing 1 a post-processing of the individual components, in particular of the housing 1, can be omitted. The individual components can optionally be assembled coming directly out of the tool.

The housing 1 comprises a housing shell 4 and a front panel 5, which will be described in more detail later. The housing shell 4 is rectangular-cuboid-shaped and includes an open side, which can be closed by the front panel 5. The housing 1 comprises a first inlet 6 and a second inlet 7, through which the medium to be dispensed enters into the housing 1. The inlets 6 and 7, which can also be referred to as main-line connectors, are disposed on respectively opposing side walls 8 and 9. The inlets 6 and 7 are fluidly connected to each other via a main line 10. The main line 10 is a tube, which is disposed essentially parallel to a base 11 of the housing shell 4. Five dispensing lines 12, 13, 14, 15, and 16 branch off from the main line 10. These are also configured as tubes. The dispensing lines 12, 13, 14, 15, and 16 are disposed in the housing shell 5 and respectively parallel to the side walls 8 and 9. Each of the dispensing lines 12, 13, 14, 15, and 16 terminates at an end opposing the main line in a receptacle 17 respectively for a metering device 2, via which the medium is dispensed in a metered manner. A first partial amount is thus applied from one of the metering devices 2 and another partial amount from a different metering device. Thus the inlets 6 and 7 are connected via a line system, which comprises the main line 10 and the dispensing line 12, 13, 14, 15, and 16.

In the housing shell 4 an intermediate wall 18 is disposed, which extends between the two side walls 8 and 9 parallel to a cover side 19 of the housing 1. The dispensing lines 12, 13, 14, 15, and 16 each end in the intermediate wall 18. The intermediate wall 18 is connected to the cover side 19 via a plurality of bridges 20, 21, 22, and 23, wherein each bridge is always disposed between two dispensing lines. The bridges and the intermediate wall serve for stabilization. In further, not-shown exemplary embodiments these components can optionally be at least partially or even completely omitted.

The components disposed in the housing shell 4—main line 10, receptacle 17, intermediate wall 18, dispensing lines 12, 13, 14, 15, and 16, and the bridges 20, 21, 22, and 23—can each be manufactured one-part but also assembled as individual parts into the housing. In some further, not-depicted exemplary embodiments the housing can also include only one or a large number of inlets and/or dispensing lines. Under certain circumstances these can also be disposed differently. In other exemplary embodiments the housing can also have a different shape. The housing can be formed one- or multi-part. In some cases the housing can comprise at least one half-shell. Under certain circumstances the half-shell can remain partially open and/or be at least partially or even completely closed via a further component.

The cover side 19 comprises a plurality of openings 24, of which each one is disposed concentrically to one of the dispensing lines 12, 13, 14, 15, and 16. The openings 24 and the dispensing lines 12, 13, 14, 15, and 16 each have the same diameter. In some further, not-depicted exemplary embodiments they can also have different diameters. Two openings 25 and 26 respectively connect to the circular openings 24, which openings 25 and 26 are part of a bayonet closure, using which the metering device 2 is fixed to the receptacle 17. The openings 25 and 26 are disposed opposite each other.

The metering device 2 or its components can also be manufactured from the materials described and using the method described. The metering device 2 comprises a metering body 3 as a component. Under certain circumstances here an internal volume of the metering device 3 can determine an amount that is metered or portioned using the metering device 2. A not-depicted piston is inserted in the metering body 3. This pumps the medium in the metering body 3. As a further component the metering device 2 can also comprise a not-depicted closure element for the metering body 3, which serves, for example, as a check valve in order to prevent that medium applied from the metering device 2 flows back into the metering device 2.

Not-depicted spring or spring elements can possibly be manufactured from spring steel and/or also from plastic. The metering device 2 is a metering valve. In order to change an amount that is to be applied or metered, the metering device 2 here can then optionally be replaced by a metering device having a different internal volume.

In some further, not-depicted exemplary embodiments metering devices can also be used that are based on a different operating principle. For example, the pumped amount or a volume of a portioned partial amount can be determined via a closing and/or an opening of the metering device.

Like the housing 1 the metering device 2 can also be configured non-threaded. A connecting of the metering device to the receptacle 4 on the housing 1 is effected via non-threaded attachment means, as described in more detail later. In some further, not-depicted exemplary embodiments the metering device 2 can also include a thread, for example for connecting to a line into which the medium is metered.

The metering body includes a section that has a smaller diameter than one of the dispensing lines 12 to 16. This section can be disposed at least sectionally in one of the dispensing lines 12 to 16. The metering device 2 further comprises lugs 28 and 29, which form a part of the bayonet closure on the metering device 2. The lugs are also opposingly disposed. On an outer casing surface, the metering device 2 includes an encircling groove 30 on which a seal ring can be disposed in order to seal the metering device 2 with respect to the dispensing line into which it is inserted. In the flow direction of the medium, at the same height as the hubs 28 and 29, the metering device 2 has a recess 31, whose function will be described in more detail later. The recess 31 has a rectangular shape. The recess 31 here does not completely break through a wall of the metering body 3.

Figures 3, 4, 5:
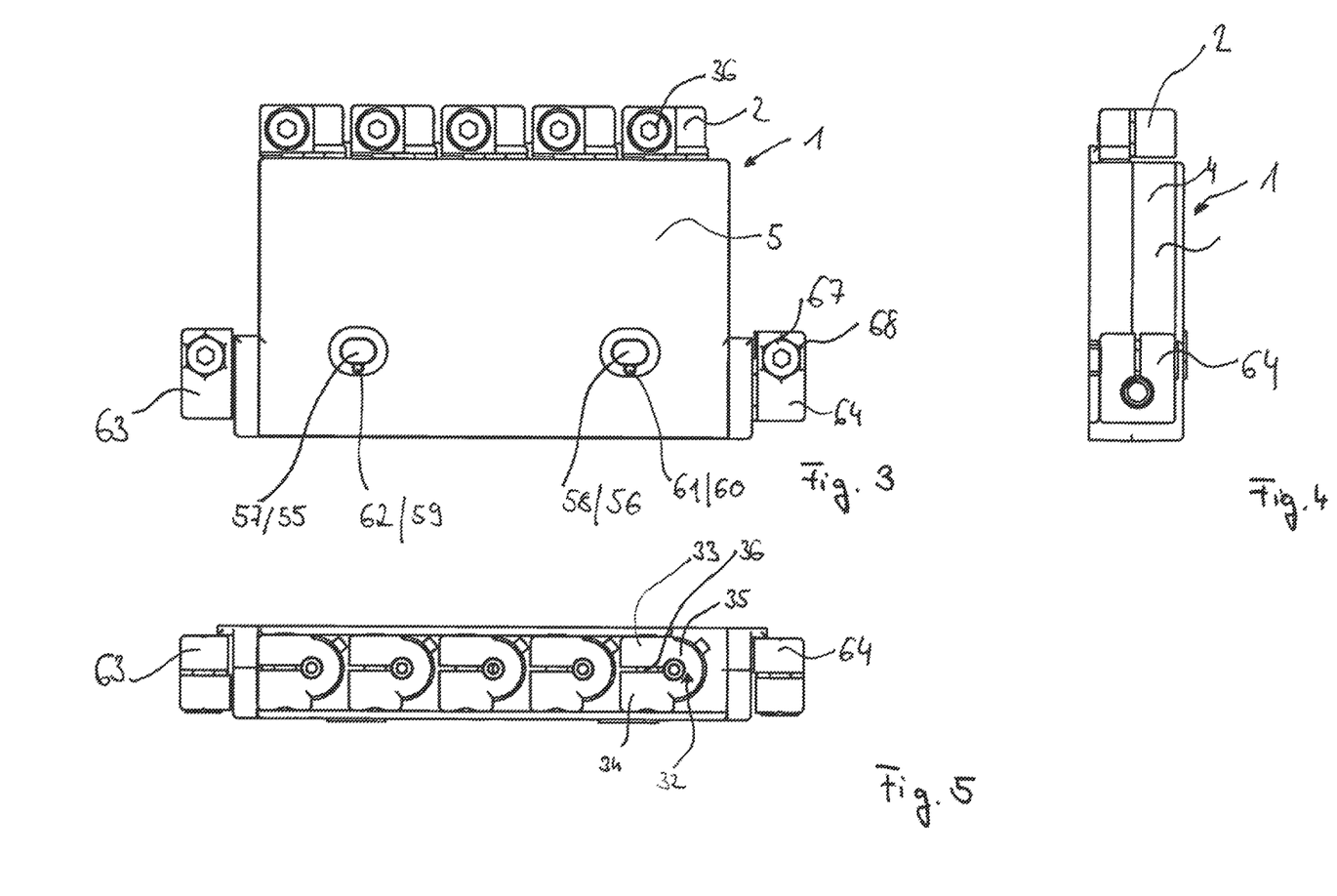
FIG. 3 shows a schematic depiction of a front view of the housing according to an exemplary embodiment including the metering device in an assembled state.
FIG. 4 shows a schematic depiction of a side view of the housing according to an exemplary embodiment including the metering device in an assembled state.
FIG. 5 shows a schematic depiction of a plan view of the housing according to an exemplary embodiment including the metering device in an assembled state.

For connecting to a line into which the medium is to be introduced in a metered manner, the metering device 2 has a line connector 32 which is configured as a clamp connection. For this purpose the line connection 32 has a C shape as is recognizable in FIG. 5. Two legs 33 and 34 are connected via an arc 35. A line, for example a lubricant line, can be disposed essentially concentric with the arc. The two arms 34 and 35 can be clamped to each other via a screw connection 36. The screw connection can possibly be a screw and a not-depicted nut. Under certain circumstances a hexagonal recess can be provided in the line connector 32 as securing against rotation for the nut. Of course the recess can also have other polygonal shapes. The line connector 32, which in some exemplary embodiments can also be referred to as lubricant-line connector, is manufactured one-piece with the metering body 3. Under certain circumstances an identical part can respectively be used as line connector, i.e., an identical component on each of the metering devices 2. Alternatively the line connector 32 can also be clamped with the not-depicted line, into which the medium is metered, to the metering body 3, for example, like a clamping jaw. In order to secure the line connector 32 in the flow direction of the medium and of course also in the other direction, securing rings and corresponding grooves can be provided. The grooves here can be provided in the metering body and/or in the line connector 32.

In order to connect the metering device 2 to the receptacle 17, the metering device 2 is positioned over the opening 24 such that the lugs 28 and 29 align with the grooves 25 and 26. Then the metering device is recessed into the receptacle 17 far enough that the lugs 28 and 29 lie between the intermediate wall 18 and the cover side 19 in the flow direction of the medium. Then the metering device 2 is rotated with respect to the receptacle 17 about an axis that is disposed parallel to the flow direction of the medium. The lugs 28 and 29 are no longer disposed aligned with the grooves 25 and 26; the metering device 2 is thereby fixed in the flow direction of the medium. The lugs 28 and 29 and the grooves 25 and 26 each have a rectangular shape. In some further exemplary embodiments the lugs and/or the grooves can also have a different shape that can serve as structure- or counter-structure for a bayonet closure. For example, instead of the lugs a plurality of pins or the like can be provided, which can be guided through a corresponding counterstructure. The metering devices 2 can each be rotated and pulled out, for example, in order to be replaced or cleaned. A simpler replacing of the metering device can thus be possible. The metering devices, which can also be referred to as lubricant-line connectors, thus include the following functions, receiving the lubrication line (clamping jaw), sealing, closing the installation opening, and defining the metered amount by a limiting of the metering stroke (metering).

The front panel 5 is configured as a plate that essentially has a size of a side of the housing shell 5. The housing shell 4 can be closed via the front panel 5. For this purpose latch connections, which can also be referred to as latches, are provided. On an inner side 37 that is facing the metering devices 2 in an installed state the front panel 5 comprises a plurality of latch projections 38 to 44 which engage in corresponding latch openings 45 to 48 in the housing shell. In some further, not-depicted exemplary embodiments the latch projections can be at least partially or completely provided on the housing shell. The front panel and the housing shell can also possibly be connected via a hinge.

In terms of construction the housing 1 as plastic housing is embodied without material accumulations, i.e., with uniform wall thicknesses. Under these conditions the geometry of the device can be relatively rugged under certain circumstances. In its function as a cover, in some exemplary embodiments the front panel 5 ensures a smooth and easy-to-clean external contour (so-called clean design), possibly with the possibility to represent design-technology features for recognition of a product-family or -series.

In some further, not-depicted exemplary embodiments the front panel can also be configured to close a plurality of sides of the housing; for example, for this purpose the front panel can have an angular shape. In some further, not depicted exemplary embodiments the front panel can also close the housing laterally, on a rear side, from above and/or from below.

For each metering device 2 the front panel 5 further comprises on its inner side a plurality of bars 49 to 53, of which each is configured in an installed state to grip the metering device 2 into the recess 31, which can also be referred to as the closing opening. The bars 49 to 53, which can also be referred to as latches, secure the metering device 2 in an interference-fit manner against rotating. Each of the bars 49 to 53 projects in a similar manner to a door lock into the recess 31 of the metering device 2, which can also be referred to as the lubricant-line connector. It is thereby prevented that the metering devices 2 rotate, and the lugs 28 and 29 can come into overlap with the grooves 25 and 26 such that the metering devices 2 can slide out of the receptacle 17. The front panel 5 thus also assumes a mechanical securing function. A securing is effected of the metering devices 2 against rotating and slipping-out. With particular emphasis on the properties of plastic, the thread construction element is not used on the housing 1; a plastic-oriented construction is implemented. The metering devices 2 are latched in the housing 1 using a bayonet lock and in some exemplary embodiments, depending on not-depicted spring elements and a clamping platform, have a relatively low self-locking against rotating and thus loosening. However, torques can act on the metering devices 2 via the not-depicted lines, for example, the lubrication line, as a result of an unfavorable installation or of movements of a lubrication point.

In order to connect the front panel 5 to the housing panel 4, in addition to the latches attachment holes are provided in the front panel 5, which attachment holes can also be referred to as installation openings 55 and 56. For this purpose the housing shell 4 comprises corresponding installation openings 57 and 58. The installation openings 55 and 56, 57 and 58 each have an oval cross-section.

In a some further, not-depicted exemplary embodiments the installation openings can also have another shape, for example, circular or rectangular. Additionally or alternatively a different number of installation openings can also be provided. Here the installation opening 57 is disposed between the outermost dispensing line 12, and the adjacent dispensing line 13, and the main line 10. The installation opening 58 is analogously disposed between the outermost dispensing line 16 and the adjacent dispensing line 15 and the main line 10. The installation openings 57 and 58 are configured as through-openings, with the result that using them the installed housing 1 can also be attached to a holder. For this purpose not-depicted attachment means can be guided through the installation openings 55 to 58. The attachment element can be, for example, a screw connection, a screw, a nail, a pin, and/or the like. The holder here can be, for example, a component to which the device or the housing is attached for an operation, for example, a frame, a housing of a machine and/or of a vehicle, or a holder or mounting provided specially for the housing.

Furthermore, means, which in some exemplary embodiments can also be referred to as metering valves, are provided on the housing, which means impede an incorrect assembling of the housing 1 such that an incorrect assembling is recognizable. For this purpose the housing shell 4 comprises a lug 59 and 60, respectively in the region of the installation openings 57 and 58, as incorrect-assembly indicator. The lugs 59 and 60 each rise over an opposing surface. Accordingly in the region of the installation openings 55 and 56 the front panel includes lug recesses 61 and 62. These serve as incorrect-assembly-indicator receptacles, into which, with installed front panel 5, the lugs 59 and 60 engage or sink. The front panel 5 can thereby nevertheless correctly abut on the housing shell 4. The lugs 59 and 60 can, for example, prevent or at least reduce the risk that the housing 1 is installed without the front panel 5. If the housing shell 4 is installed without the front panel 5, a screw or a screw head finds no flat abutment surface. The screw is installed obliquely with respect to the bore. An incorrect assembly is thus obvious.

In some further, not-depicted exemplary embodiments other incorrect-assembly indicators can also be provided near the installation openings in the housing, which incorrect-assembly indicators are configured to prevent an installation of the attachment element concentric to the installation opening. In some further, not-depicted exemplary embodiments the incorrect-assembly indicators can also have another shape, for example, an inclined plane, that can be put together with a corresponding inclined counterstructure in the front panel in the form of a bevel. In an installed state incorrect-assembly indicators and incorrect-assembly-indicator receptacles can, for example, combine into a cylindrical attachment sleeve.

The front panel 5 thus also has the function of preventing an incorrect use of the device. In some exemplary embodiments, in an installed state the device is misuse-secure (from the English "misuse"). For this purpose the front panel 5 is latched into the housing shell 4 and removable with the help of a suitable lever tool (e.g., screwdriver). For some devices, such as metering valves, wall installations are prescribed according to use. A flying installation, i.e., simply hanging on lines, can be inadmissible, for example, in order to prevent a risk of accident, a line breakage, or the like. Attachment screws or other attachment means can be guided through the front panel 6 and the housing shell 4 in order to fix the housing 1 on the wall or another holder. With a device mounted on the wall or on another holder a removing of the front panel 5 is not possible. The installing of the device without front panel 5 is impeded by the two lugs 59 and 60 on the attachment- or installation-openings and clearly shows an incorrect installation.

In some exemplary embodiments the front panel 5 can thus perform three tasks. It can make possible the implementation of a plastic-oriented construction without limitations to reliability and appearance and is thus relevant for a design of the housing. Furthermore, the front panel 5 can serve as a cover and mechanical securing and can prevent a misuse in an installed state.

Figure 2:
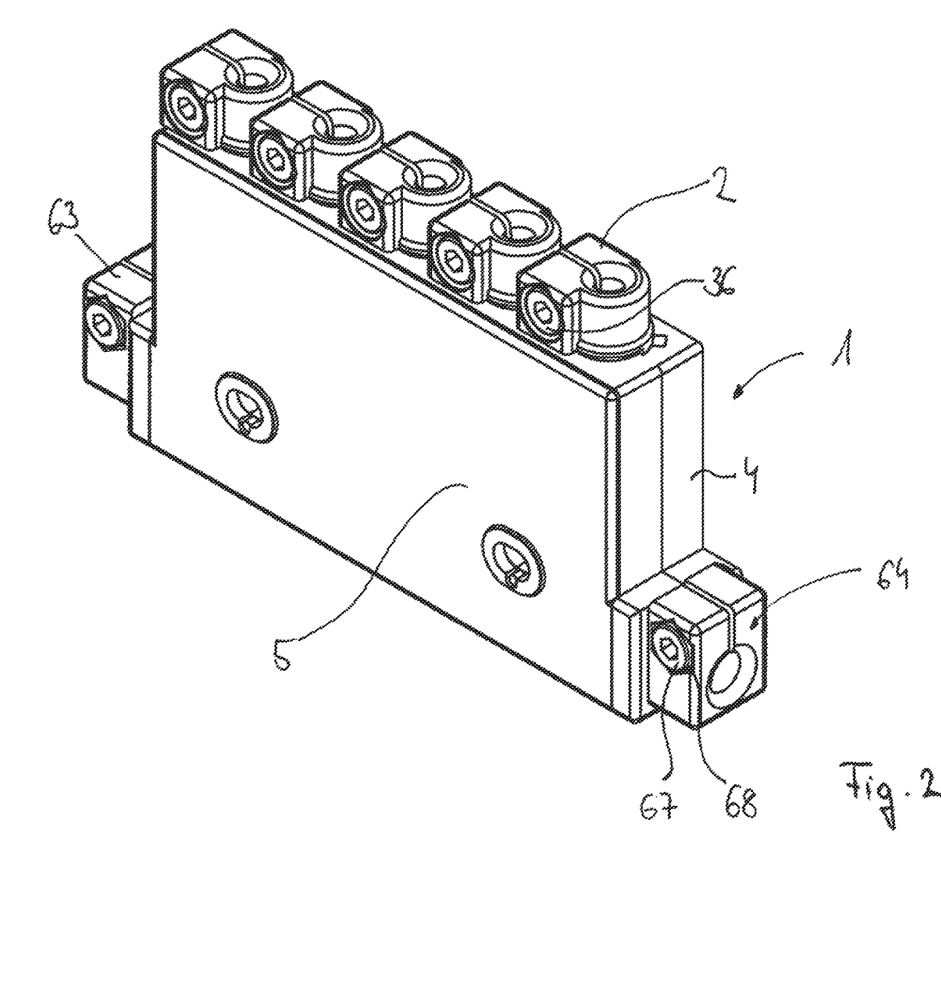
FIG. 2 shows a schematic depiction of a perspective view of the housing according to an exemplary embodiment including the metering device in an assembled state.

The inlets 6 and 7 can each be connected via a connector part 63, which is configured as a clamp connection, to a not-depicted main connector line, via which the medium is pumped to the housing 1. The connector parts 63 and 64 are each configured as a clamping jaw as already described for the metering devices 2. The not-depicted main connector line is inserted into the main line 10 with a seal, for example, an O-ring. A pocket 65 and 66 is respectively disposed on the side walls 8 and 9 of the housing shell 4 outwardly in the region of the inlets. In the interior these have at least one not-depicted axial stop for a not-depicted securing ring. The main connector line can thereby be attached to the housing 1 in the flow direction and counter-flow direction of the medium. As visible, for example, in FIG. 2 or 3, the connector parts 63 and 64 include an opening 68 having a hexagonal cross-section. In some further, not-depicted exemplary embodiments the opening can also have any other shape, for example, circle, rectangle, square, or the like. In the opening 68 a screw 67 is inserted and a not-depicted nut in order to clamp the arms of the connector parts 63 and 64 to each other. Because a nut is inserted in the opening, the opening has a hexagonal cross-section as rotational securing for the nut. In some further, not-depicted exemplary embodiments the opening can have a shape that serves as rotational securing for a nut or screw connection inserted into the opening.

The line connectors 32 and the connector parts 63, 64 assume a plurality of functions and are also manufactured from plastic and are non-threaded. Under certain circumstances the lubricant lines, or other lines that connect to the metering devices 2, and the main connector lines must experience movements in a manner depending on the installation and can thus exert a torque and tensile forces on the connection system.

In conventional metering valves for lubricant- and main-lines, threads in the housing for connection fittings, solderless tube fittings with tapered ring, e.g., according to DIN 3862 (compression fittings), solderless tube fittings with cutting ring, e.g., according to DIN ISO 8434-1 (cutting ring fittings) or plug connectors with claw pliers are used as conventional connecting techniques. Connection armatures must accordingly be fixedly tightened in order to achieve a self-locking (tension) against loosening. Tapered- and cutting-ring fittings also required corresponding tightening torques in order to generate the necessary deforming forces for the rings and to achieve a self-locking (tension) against loosening. Due to design, plug connectors transmit no torque via the line; however, the rotational movement stresses the seal. Tensile forces must be absorbed by the claw pliers; the plug connector itself must be screwed-in into an existing thread. For all mentioned conventional connectors metal is recommended to be used at the highly loaded points such as threads, tapered ring, cutting ring, claw pliers, etc. All mentioned systems or possibilities are composed of a more or less large number of components.

In contrast, in exemplary embodiments wherein the housing is used in a lubrication system the connectors are embodied from plastic with a plastic-suitable clamping technology that can be suited for all common line types in the central lubrication system. The hydraulic seal is effected by O-rings; the torques and tensile forces are absorbed via the line connectors 32 and the connector parts 63 or the clamping jaw made from plastic. The O-rings here seal only statically and can thus have only a slight or absolutely no abrasion. The clamping forces are generated and maintained by a commercially available screw/nut connection.

Figure 6:
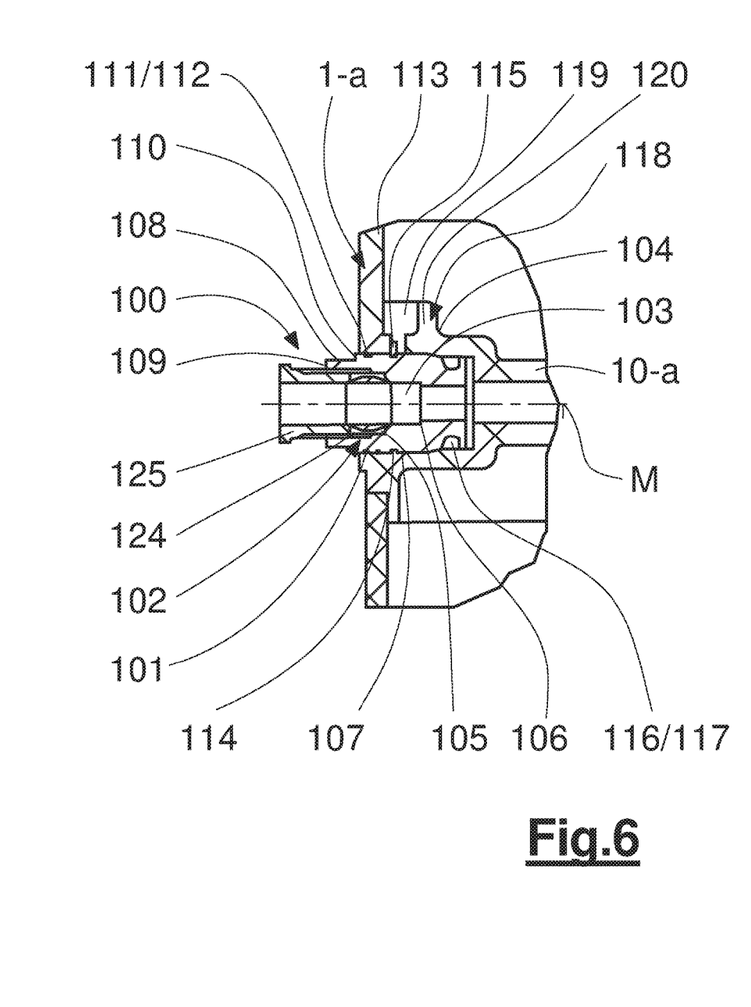
FIG. 6 shows a schematic depiction of a sectional view of a connector part for the housing according to an exemplary embodiment.
Figure 7:
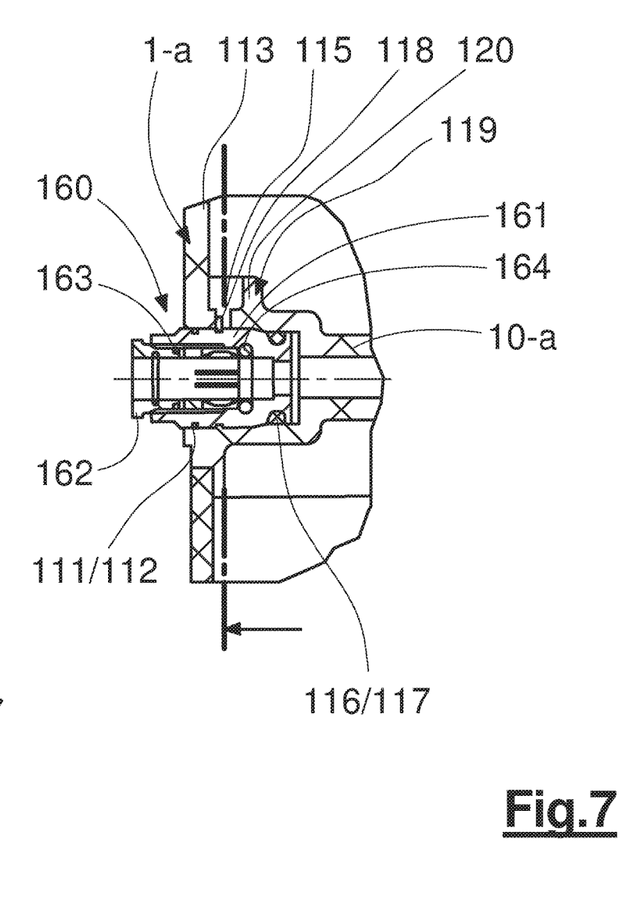
FIG. 7 shows a schematic depiction of a further connector part for the housing according to an exemplary embodiment.

FIGS. 6 and 7 show a schematic representation of a sectional view of connector parts 102 and 161 for a housing 1-a according to an exemplary embodiment. The housing 1-a can be configured essentially analogously to the housing 1; the inlets can be connected to a main connector line via one of the described connection assemblies 100 or 160.

The connection assembly 100 for a media-carrying line comprises the housing 1-a including at least one bore 101. The bore 101 serves here as inlet. In the bore 101 a connector part 102 is rotatable about a central axis M and disposed sealed with respect to a medium that is carried in the line. The connector part 102, which can also be referred to as an insert, is manufactured from a different material than the housing 1-a. The connector part includes at least one sleeve-shaped section.

A rotatable disposing of the connector part 102 in the bore 101 can be effected here, for example, such that the connector part 102 can be rotated in the bore 101 about the central axis M at least by a quarter, a half, a whole, or a plurality of rotations without this leading to a damaging of the housing 1-a or of the connector part 102. A torque that is applied to the connector part 102 is thus not transmitted to the housing 1-a. Under certain circumstances a threshold torque can be set, up to whose exceeding the connector part 102 is held in the bore 101 in a friction-fit manner. Only after the exceeding of this threshold torque is the connector part 102 rotated in the bore 101. Furthermore the connection between the housing 1-a and a line that is connected to the housing 1-a via the connector part 102 is sealed even when the connector part 102 is rotated in the bore 101.

The connector part 102 comprises a through-bore 103 by which the medium can pass-through the connector part 102. The through-bore 103 is surrounded by a sleeve-shaped section 104 and is disposed concentric to the sleeve-shaped section 104. The through-bore 103 is configured as a stepped bore having three different diameters. A region having a medium diameter is disposed in the axial direction between the region having the largest diameter and the region having the smallest diameter. A first shoulder 105 and a second shoulder 106 thereby arise radially inside on the connector part 102. The connector part 102 is disposed on the housing 1-a such that the region having the largest diameter protrudes out of the housing 1-a.

On a radially outwardly directed outer surface 107 the connector part 102 at least sectionally has a diameter that results in a clearance fit with the inner diameter of the bore 101, with the result that the connector part 102 can rotate in the bore 101. The connector part 102 further includes a holding surface 108 on its radially outwardly directed outer surface 107. The connector part 102 can optionally be held by a tool on the holding surface 108. As visible in FIGS. 2 and 4 the holding surface 108 comprises two flat sections. For this purpose a circle segment has respectively been removed from the imaginary cylindrical outer surface 107. The holding surface 108 is disposed on an axial end of the connector part 102, which axial end protrudes from the housing 1-a in an assembled state. The holding surface 108 ends at a front edge of the connector part 102 to which an end surface 109 of the connector part 102 connects.

In some further, not-depicted exemplary embodiments the holding surface can also be omitted or have a different shape. Under certain circumstances the holding surface can be configured to grip the connector part with a tool. The tool can be, for example, a wrench. Accordingly the holding surface can have a polygonal edge, for example, a hexagon. Additionally or alternatively the holding surface can be a recess, for example, a bore, which can be engaged in by a tool. Likewise the holding surface can have a surface that is configured to be gripped with pliers. Under certain circumstances the surface can have a structure with elevations and/or recesses. The holding surface can be configured to apply a counter-torque to the connector element. Here the counter-torque can be opposed to a torque that is exerted for connecting the connector part to the line or a connecting piece for the line.

A shoulder 110 is disposed adjacent to the holding surface 108 in the axial direction. A section having a larger diameter than in the region of the holding surface 108 connects to the shoulder 110. In some further, not-depicted exemplary embodiments the shoulder and the outer-diameter change resulting therefrom can also be omitted. On one side of the shoulder 110, which side faces away from the holding surface 108, the connector part 102 comprises a groove 111 on its radially outwardly directed outer surface 107. The groove is disposed encircling in the circumferential direction and serves for receiving a seal 112. In an installed state the seal 112 is located in an axial overlapping with the wall 113 of the housing 1-a. Here the wall 113 of the housing 1-a is a region wherein the housing 1-a has an average wall thickness. For example, the wall 113 can be a protective shell that shields an interior of the housing 1-a with respect to an environment. For example, the wall 113 can be thin with respect to an extension of the housing 1-a. The housing can have an extension in the same direction which an average wall thickness also extends that is greater than the wall thickness at least by a factor 4, 5, 8, 10, 15, 20, 25, 30, 50, 100, 150. The seal 112 can comprise, for example, an elastic material or be manufactured therefrom. For example, the seal 112 can be a ring or a strip that has been inserted into the groove 111. In the radial direction the seal 112 has a greater extension than the groove 111 so that it protrudes from the groove 111 in order to effect a sealing against dirt and moisture penetrating from outside into the housing 1-a. In many application cases electrical and/or mechanical components to be protected can be located in the housing 1-a.

Furthermore, the connector part 102 also comprises a seal-receiving groove 116, which is also disposed encircling on the outer surface 107 in the circumferential direction. The seal-receiving groove 116 is located near an axial end of the connector part 102 that is facing away from the holding surface 108. The seal-receiving groove 116 is disposed axially inside a section wherein the connector part 102 tapers and has a smaller diameter. Since the connector part 102 tapers, under certain circumstances an inserting into the housing 1-*a* can be facilitated. A seal 117 is disposed in the seal-receiving groove 116. The seal 117 is configured as an O-ring. The connector part 102 also assumes a sealing function with respect to the housing 1-*a* against the to-be-transported and usually pressurized medium.

In some further, not-depicted exemplary embodiments the connector part can have a different shape. For example, a sleeve-shaped section can be any component that is configured to allow a medium to pass through guided by an outer wall. For example, the component can include a bore for this purpose. The bore and/or an outer surface of the sleeve-shaped section can have all possible shapes, for example, circle, rectangle, polygon, or the like. The bore can be disposed concentric to the outer surface. The sleeve-shaped section can be configured cylindrical or, however, also change its shape and/or its size in the axial direction.

In the exemplary embodiment of the Figures, a line 10-*a* connects via a pocket 118 to the wall 113 of the housing, in an essentially analogous manner to the main line 10 of FIGS. 1 to 5, into which the medium is introduced. The wall 113 of the housing 1-*a*, the pocket 118, and the line 10-*a* are manufactured one-piece. The connector part 102 is thus disposed partially overlapping in the axial direction radially inside the line 10-*a*. The seal 117 in addition is thus disposed radially between the connector part 102 and the line 10-*a*, axially overlapping with the pocket 118. Here the line 10-*a* has a larger diameter in the region of the pocket 118 than its average line-opening cross-section. The pocket 118 is essentially a reinforcing and material accumulation. The housing 1-*a* can thus be designed and dimensioned for the supporting of the corresponding forces.

The pocket 118 furthermore has an axial gap 119. This arises between an inner side of the wall 113 and a shoulder 120 of the pocket 118. The connector part further includes a securing-ring groove 114 encircling in the circumferential direction on its outer surface 117. This serves to receive a securing ring 115. The connector part 102 can be secured on the housing 1-*a* in axial direction M by the securing ring 115. For this purpose the securing ring 115 abuts on an inner side of the wall 113 of the housing 1-*a*. The securing ring 115 serves for the supporting or for the transmitting of the axially acting forces onto the housing 1-*a*, the main part of which forces is generally generated by the pressurized medium. The securing ring 115 has the shape of a crescent ring and secures the connector part 102 against being pulled out of the bore. The securing ring 115 and thus also the connector part 102 can move in the axial direction along an axial extension of the gap 119. The shoulder 120 here protrudes radially outward, away from the line 10-*a* and represents a further stop for the securing ring 115 in the axial direction. The inner side of the wall 113 represented the axial stop for the securing ring 115 in the opposite axial direction. A force flow from the shoulder 120 and a sealing with respect to the medium can thus be effected by the pocket 118. In some further, not-depicted exemplary embodiments the securing ring can have another shape, be inserted into a groove in the housing, and/or only be supported against a shoulder.

The pocket 118 extends not circumferentially, rather only sectionally around the bore 101 or the connector part 102. For this purpose the pocket 118 comprises two arms disposed essentially parallel to each other, which receive the bore 101 between them. In the radial direction the pocket 118 has, at least sectionally, a greater extension than the bore 103 in the housing 1-*a*. In addition, the pocket 118 points in the axial direction into an interior that is at least partially enclosed by the housing 1-*a*. An axial extension of the pocket 118 is greater than an average wall thickness 113 of the housing 1-*a*. The pocket 118 is thus disposed in the housing 1-*a* and placed on the inner side, with the result that it is not visible from outside. Thus the outer contour of the housing 1-*a* can be embodied smooth, without projections and recesses.

In some further, not-depicted exemplary embodiments the pocket can also have another shape, be omitted, or disposed on an outside of the housing. The pocket can possibly also be disposed on both sides of the housing wall. Under certain circumstances the grooves for receiving the seals can also be disposed in the pocket. Under certain circumstances all components, such as securing rings and seals, can also be disposed on the housing. In some exemplary embodiments an assembling can thus possibly be simplified if the connector part only needs to be inserted into the bore in the housing.

As material the connector part 102 includes a metal or another material different from plastic. The housing 1-*a* is manufactured from a plastic. The connector part 102, which can also be referred to as a plug insert, is radially inwardly configured to be connected to a not-depicted line in which a medium is carried. The fixing and sealing of the line, which can also be referred to as a tube line, can be configured as a tube fitting. Here it can be a general tube fitting or a tube fitting according to a DIN standard, for example, DIN 3862, DIN 3852, DIN EN ISO 8434, or the like.

The connector for the tube line comprises more than one part to be mounted, namely a connecting piece 125 that can be connected to the connector part 102. The connecting piece 125 is radially inserted into the connector part 102 at least sectionally overlapping axially. For this purpose the connector part 102 includes a thread on its radially inwardly directed surface in the region having the largest inner diameter. In some further, not-depicted exemplary embodiments the thread can also be provided on another section. On its radially outwardly directed surface the connecting piece 125 has an external thread that is configured to be connected to the thread 124. The connecting piece 125, which can also be referred to as a screwed-on plug connector, is configured essentially sleeve-shaped. Particularly in the exemplary embodiments wherein the connecting piece is connected to the connector part 102 via a thread, i.e., by rotating, the providing of the holding surface 108 on the connector part 102 can be relevant.

FIG. 7 shows the connection assembly 160. The connection assembly 160 is configured essentially similar to the connection assembly 100. A differentiating feature is that the connector part 161 is configured to receive a plug connection. A fixing and sealing of the tube line can be effected via a so-called quick connector or plug connector. The arranging of the connector part 161 in the housing 1-*a* is effected in an analogous manner as described for FIG. 6. A connecting piece 162 is used as quick connector, which connecting piece 162 is configured to clamp on an inner surface of the connector part 161. In order to seal the connecting piece 162 with respect to the medium against the connector part 161 a first seal ring 163 is disposed in the radial direction between the connecting piece 162 and the connector part 161. A second seal ring 164 is disposed between an axial end of the connecting piece 162 and an axial stop of the connector part 161. Since no torque needs to be applied for connecting the connecting piece 162 to the connector part 161, the holding surface can be omitted.

In some exemplary embodiments the connector part is thus rotatably inserted in the inlet of the housing. Under certain circumstances it can thus be avoided that a torque that acts on the connector part is transmitted to the housing. This can be relevant, for example, if the connector part has an internal thread via which it is connected to a thread of a connector line.

The housing 1 and the metering device 2 according to the exemplary embodiment of the Figures can optionally be used in all possible lubrication systems and lubrication applications, for example, in manufacturing plants, transport equipment, or also vehicles such as agricultural machines, construction vehicles, and/or the like. Here, for example, it is a metering valve in a plastic embodiment for central lubrication systems having integrated connection technology for main- and secondary-lines. Furthermore, under certain circumstances the housing and the metering device can also be used for metered dispensing of other media, for example, in bottling plants, cleaning equipment, hydraulic systems, pneumatic systems, and/or the like.

The exemplary embodiments and their individual features disclosed in the above description, the following claims, and the accompanying Figures can be meaningful and implemented both individually and in any combination for the realization of an exemplary embodiment in its various designs.

REFERENCE NUMBER LIST

1 Housing
2 Metering device
3 Metering body
4 Housing shell
5 Front panel
6 Inlet
7 Inlet
8 Side wall
9 Side wall
10 Main line
11 Base
12 Dispenser line
13 Dispenser line
14 Dispenser line
15 Dispenser line
16 Dispenser line
17 Receptacle
18 Intermediate wall
19 Cover side
20 Bridge
21 Bridge
22 Bridge
23 Bridge
24 Opening
25 Opening
26 Opening
28 Lug
29 Lug
30 Groove
31 Recess
32 Line connector
33 Arm
34 Arm
35 Arc
36 Attachment means
37 Inner side
38 Latch projections
39 Latch projections
40 Latch projections
41 Latch projections
42 Latch projections
43 Latch projections
44 Latch projections
45 Latch opening
46 Latch opening
47 Latch opening
48 Latch opening
49 Bar
50 Bar
51 Bar
52 Bar
53 Bar
55 Installation opening
56 Installation opening
57 Installation opening
58 Installation opening
59 Lug
60 Lug
61 Lug receptacle
62 Lug receptacle
63 Connector part
64 Connector part
65 Pocket
66 Pocket
67 Screw
68 Opening
100 Connection assembly
101 Bore
102 Connector part
103 Through-bore
104 Sleeve-shaped section
105 First section
106 Second section
107 Outer surface
108 Holding surface
109 End surface
110 Shoulder
111 Groove
112 Seal
113 Wall
114 Securing-ring groove
115 Securing ring
116 Seal-receiving groove
117 Seal
118 Pocket
119 Gap
120 Shoulder
124 Thread
125 Connecting piece
160 Connection assembly
161 Connector part
162 Connecting piece
163 Seal
164 Seal
M Axis of rotation

The invention claimed is:

1. A housing for a device for metered dispensing of a medium, wherein the housing includes at least one inlet that is configured to allow the medium to enter into the housing from a reservoir, wherein the inlet is connectable to an inlet line and the housing comprises:

a cuboid housing shell formed of a plastic material, the housing shell including a first side panel with the inlet formed therein, a second side panel opposite the first side panel, and a base opposite a cover side with the first and second side panels spaced apart and connected between the base and cover side, the cover side having at least one opening formed therein;

an inlet line connected to the inlet formed in the first side panel, the inlet line extending inside the housing shell;

at least one receptacle within the housing shell, the receptacle connected to the inlet line and the opening in the cover side;

at least one metering device positioned in the opening in the cover side, the metering device configured to dispense the medium in a metered manner; and at least one incorrect-assembly indicator is provided on the housing, which incorrect-assembly indicator impedes the incorrect assembly of a front panel on the housing such that an incorrect assembly is recognizable.

2. The housing according to claim 1, wherein the receptacle and/or the inlet in the housing is configured non-threaded.

3. The housing according to claim 1, wherein the receptacle comprises an attachment structure that is configured to interact with a counter-attachment structure of the metering device such that the metering device is fixed on the receptacle at least in the flow direction of the medium.

4. The housing according to claim 1, further comprising:
the front panel releasably secured to the housing and including a plurality of bars;
wherein the plurality of bars fix the at least one metering device against rotating with respect to the receptacle.

5. The housing according to claim 1, wherein the inlet is connected to the inlet line via a connector part that is inserted in a non-threaded manner in the inlet, and
wherein the connector part is connectable to the connector line via a clamp-, screw-, or plug connection.

6. The housing according to claim 5, wherein the housing includes at least one axial stop, which is configured to secure the connector part on the inlet in the flow direction of the medium.

7. The housing according to claim 5, wherein the connector part is rotatably inserted in the inlet of the housing.

8. The housing according to claim 1, wherein the metering device comprises a metering body manufactured from plastic.

9. The housing according to claim 1, wherein the receptacle and/or the inlet in the housing is configured metal-free.

10. The housing according to claim 1, further comprising the front panel having at least one installation opening, which corresponds to at least one installation opening in the housing, and the front panel installation opening and the housing installation opening are configured to receive an attachment element for fixing the housing on a holder.

11. The housing according to claim 3, further comprising:
the front panel configured to fix at least one of the metering devices against rotation relative to the receptacle;
at least one incorrect-assembly indicator on the housing configured to make an incorrect assembly of the housing recognizable;
wherein the inlet is connectable to an inlet line via a connector part that is inserted in a non-threaded manner in the inlet, wherein the connector part is connectable to the connector line via a clamp, screw, or plug connection;
wherein the housing includes at least one axial stop, which is configured to secure the connector part on the inlet in the flow direction of the medium, and
wherein the connector part is rotatably inserted in the inlet of the housing.

12. The housing according to claim 1,
wherein the housing comprises a plurality of threadless receptacles; and
wherein the inlet is threadless;
the housing further including a metering device in each of the plurality of threadless receptacles and the inlet line in the housing connected to the at least one threadless inlet and a plurality of distribution lines connected to the inlet line and to each of the plurality of threadless receptacles,
wherein each of the metering devices includes a pair of lugs configured to pass through corresponding slots in the housing and wherein the pair of lugs are configured to prevent the metering devices from being removed from the housing when the pair of lugs are not aligned with the slots.

13. The housing according to claim 12, wherein the housing comprises a body portion having a wall removably securable to the body portion, the wall including a plurality of projections, wherein each of the metering devices includes an opening facing the wall when the pair of lugs are not aligned with the slots, and wherein the projections extend into the openings and prevent rotation of the metering devices when the wall is secured to the body portion.

14. A housing for a device for metered dispensing of a medium, the housing comprising:
at least one threadless inlet formed in a side panel of the housing, the threadless inlet configured to allow the medium to enter the housing from a reservoir;
a plurality of openings in the housing, the openings for dispensing metered medium;
a plurality of threadless receptacles within the housing and each of the plurality of receptacles connected to one of the plurality of openings;
a metering device in each of the plurality of openings and connected to the threadless receptacles;
an inlet line connected to the at least one threadless inlet and the inlet line connected to each of the plurality of threadless receptacles;
wherein the housing comprises a plastic material; and
wherein each of the metering devices includes a pair of lugs configured to pass through corresponding slots in the housing and wherein the pair of lugs are configured to prevent the metering device from being removed from the housing when the pair of lugs are not aligned with the slots.

15. The housing according to claim 14, wherein the housing comprises a body portion having a wall removably securable to the body portion, the wall including a plurality of projections, wherein each of the metering devices includes an opening facing the wall when the pair of lugs are not aligned with the slots, and wherein the projections extend into the openings and prevent rotation of the metering devices when the wall is secured to the body portion.

* * * * *